2,988,561
PURIFICATION OF LEAD STYPHNATE

Julius M. Komarmy, Fayetteville, Ark., assignor, by mesne assignments, to the United States of America as represented by the Secretary of the Navy
No Drawing. Filed Mar. 2, 1954, Ser. No. 413,736
5 Claims. (Cl. 260—435)

The present invention relates to a method for the purification of lead styphnate whereby an improved product is obtained which, by reason of the highly purified state thereof, makes possible the determining of more reliable data concerning the physical and chemical properties thereof and which may be employed to advantage as the explosive element of electrical initiators for fuzes or the like.

Prior art methods include the obtaining of lead styphnate in a finely divided state by use of a ball mill. The chief disadvantage of this method is that the product is highly sensitive to shock and mechanical friction.

The present invention provides a method of purification of the compound while it is in the wet state thus avoiding the dangers present in the prior art.

An object of the invention is to provide a new and improved method for the purification of lead styphnate which avoids the dangers of the prior art.

Another object is to provide a new and improved method wherein lead styphnate is brought to a high degree of purification.

Still another object is to provide a new and improved method for the purification of lead styphnate wherein safety and economy are important features.

Other objects and many of the attendant advantages of this invention will be readily appreciated as the same becomes better understood by reference to the following detailed description.

In practicing the method of the present invention, an excess amount of preferably unballed lead styphnate (1 to 2 grams) is added to approximately 200 cc. of glycerol. This mixture is heated to a temperature of approximately 80° C., while being stirred mechanically, until the mixture reaches a state of solution (required time 1 to 2 hours). Water is now added to the mixture until preliminary precipitation starts whereupon the precipitate is separated from the mixture, preferably by filtration. Acetone is now added to the filtrate until precipitation of the purified lead styphnate begins. The purified lead styphnate is separated preferably by filtration, followed by a water wash and an acetone wash. Finally the recrystallized lead styphnate is dried by the usual procedures.

The foregoing process results in lead styphnate of high purity which is of use in securing reliable experimental data concerning the physical and chemical properties thereof. In commercial use, the hereindescribed method is of value, particularly since the principal ingredients of the process (glycerol and acetone) are of low cost.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. The method of obtaining purified lead styphnate comprising the steps of adding commercial lead styphnate to glycerol in the approximate proportion of 1 to 2 grams of lead styphnate to 200 cc. of glycerol, heating the mixture of lead styphnate and glycerol to a temperature of approximately 80° C., stirring the mixture during the heating thereof until a state of solution is attained, adding water to the mixture until preliminary precipitation starts, filtering the mixture, adding sufficient acetone to the mixture to cause precipitation of the purified lead styphnate, separating the purified lead styphnate from the mixture by filtering, washing the purified lead styphnate with water, and washing the purified lead styphnate with acetone.

2. The method of obtaining purified lead styphnate comprising the steps of adding commercial lead styphnate to glycerol in the approximate proportion of lead styphnate 1 to 2 grams and glycerol 200 cc., heating and stirring the lead styphnate and glycerol until a state of solution thereof is attained, adding water to the solution thereby to cause preliminary precipitation, separating the precipitate from the solution, adding acetone to the solution whereby purified lead styphnate is precipitated therefrom, separating purified lead styphnate from the solution, washing the lead styphnate in water, washing the lead styphnate with acetone, and drying the lead styphnate.

3. The method of obtaining purified lead styphnate comprising the steps of stirring a mixture of commercial lead styphnate and glycerol in the approximate proportion of 1 to 2 grams of lead styphnate to 200 cc. of glycerol at a temperature of approximately 80° C. until the mixture reaches a state of solution, adding sufficient water to the mixture to start precipitation, filtering the mixture, adding sufficient acetone to the mixture to cause precipitation of the purified lead styphnate, filtering the purified lead styphnate from the mixture, and washing the purified lead styphnate.

4. The method of obtaining purified lead styphnate comprising the steps of mixing commercial lead styphnate with glycerol in the approximate proportion of 1 to 2 grams of lead styphnate to 200 cc. of glycerol at a temperature of approximately 80° C. until a state of solution is attained, adding sufficient water thereto to start precipitation, filtering the mixture, adding sufficient acetone to the mixture to cause precipitation of the purified lead styphnate, filtering the purified lead styphnate from the mixture, and washing and drying the purified lead styphnate.

5. The method of obtaining purified lead styphnate comprising the steps of adding water to a solution of lead styphnate and glycerol to cause preliminary precipitation thereof, filtering out the precipitated substance, adding acetone to the solution to cause the precipitation of purified lead styphnate therefrom, and filtering the purified lead styphnate from the solution.

No references cited.